G. BUCHAN, Sr.
CHUTE SUPPORT.
APPLICATION FILED JULY 18, 1921.
1,423,643. Patented July 25, 1922.
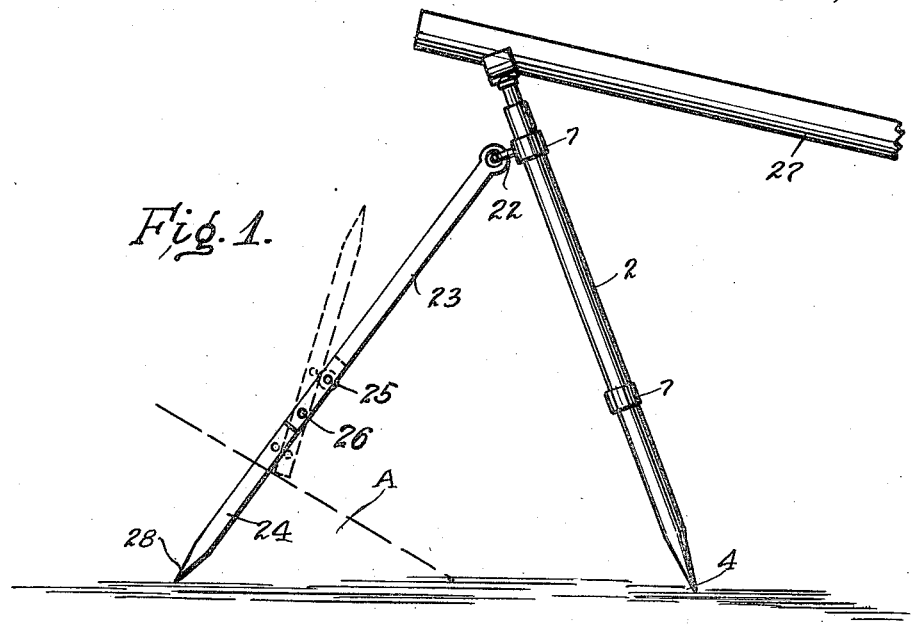
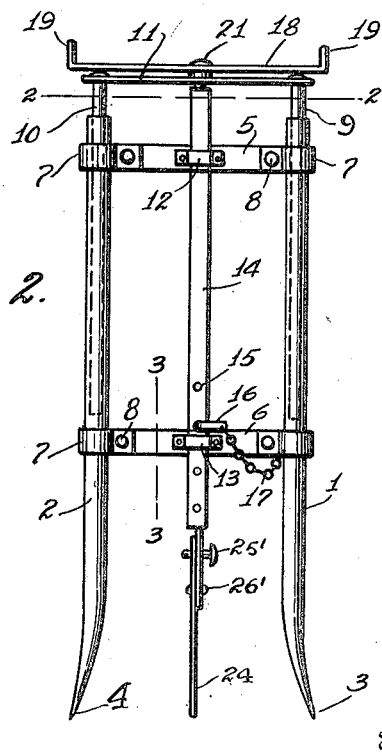
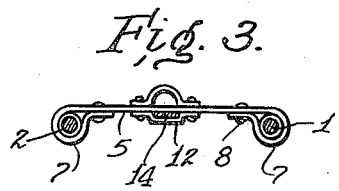

UNITED STATES PATENT OFFICE.

GEORGE BUCHAN, SR., OF MANSFIELD, OHIO.

CHUTE SUPPORT.

1,423,643.  Specification of Letters Patent.  Patented July 25, 1922.

Application filed July 18, 1921. Serial No. 485,560.

*To all whom it may concern:*

Be it known that I, GEORGE BUCHAN, Sr., a citizen of the United States of America, residing at Mansfield, in the county of Richland and State of Ohio, have invented certain new and useful Improvements in Chute Supports, of which the following is a specification.

This invention relates to a chute support.

The present invention consists primarily in providing means for supporting a chute for unloading coal or the like that is not attached in any manner to a vehicle or the like, but is self sustained and supported and adapted to support the chute without association or combination with any other apparatus, vehicle, platform or the like.

The objects of the invention are to provide means of supporting a chute at any vertical degree of inclination with respect to the ground within the limits of its adjustment; to provide adjustable means for sustaining and supporting the chute in close proximity to an abutment or bank; to provide means of preventing the chute supporting means from slipping on the ground or the like; to provide means for supporting the chute supporting mechanism from abutments of different sizes, heights or irregular shapes; to provide an adjustable bracing and supporting means to support the chute; to provide a compact support for convenience in transporting and economy in storage, and to provide means for unloading coal or the like at a pre-determined place or places (in any horizontal angular relation to the chute supporting means) without changing the position or location of the chute supporting mechanism.

These and other objects are obtained by the mechanism illustrated in the accompanying drawing in which:—

Fig. 1, is a side elevation of the chute support.

Fig. 2, is a front elevation of the chute support.

Fig. 3, is a cross section of the chute support taken on line 2—2 of Fig. 2.

Fig. 4, is a section of the support taken on the line 3—3 of Fig. 2.

In the drawings reference numerals 1 and 2 represent tubular standards having their lower ends 3 and 4 sharpened or pointed to penetrate any substance upon which they are mounted or supported to prevent slippage of the parts when assembled as hereinafter described. The preferable construction is to insert solid tapered and pointed plugs into the lower ends of the standards and weld the plugs to the standards.

The tubular standards 1 and 2 are held and secured in spaced relation to each other by cross braces 5 and 6, the cross braces being adjustably secured to the standards by the frictional clamping members 7 and bolts 8. Bars 9 and 10 which are preferably formed round in cross section are telescopically and slidably fitted to the tubular members 1 and 2 and adapted to be supported therein at any point of their adjustment.

The telescopic bars 9 and 10 are connected together by a cross bar 11 to permit the lowering or raising of the bars 9 and 10 simultaneously. Bearing boxes 12 and 13 are secured to the cross braces 5 and 6 and a bar 14 is slidably fitted to said bearings for adjustment. The upper portion of the bar 14 is securely attached to the bar 11 in any well known manner.

A series of apertures 15 are provided in the bar 14. A pin 16 is provided and attached to a chain 17 to hold the bar 14 at any point of its adjustment. The bar 14 and its attachments are adjustably supported upon the pin 16 which in turn contacts with the bearing box 13 and is supported thereby.

It will be observed that the above described mechanism provides means of raising or lowering the bars 9 and 10, the cross bar 11 and the pivoted chute supporting bar 18 simultaneously, which bar is provided with upturned ends 19 and 20. The pivoted bar 18 is pivotally secured to the cross bar 11 by a pin 21 or the like. The above described mechanism is supported through the medium of a foldable brace bar which is pivotally connected to the cross brace 5 through the medium of a hook and eye connection 22 or the like.

The foldable brace comprises the parts 23 and 24. Apertures 25 and 26 are provided in both parts to provide means for adjusting the parts upon each other in overlapping relation to maintain and to support the chute supporting mechanism at different angular relations or from a different size or irregular shaped abutment as shown in Fig. 1, at A.

The parts 23 and 24 are connected together through the medium of pins 25' and 26' at any point of their adjustment upon each other. The part 24 is provided with a sharpened end portion 28 to permit it to penetrate the support upon which it is mounted or supported to prevent slippage from the position that it is placed in, co-operating for that purpose with the pointed portions 3 and 4 of the tubular standards. When it is desired to transport the chute supporting mechanism from place to place the part 24 may be folded in overlapping relation to the part 23 and both parts swung in close proximity to the tubular members for convenience and to conserve space in transporting.

In the operation of the chute support the chute 27 is adapted to rest upon the chute supporting bar 18 and is held in any angular vertical relation with respect to the supporting mechanism by adjusting the bars 9 and 10 in the tubular standards. They are adjustably held at different predetermined positions through the medium of pin 16 which rests upon and is supported by the bearing box 13.

Further angular adjustment of the chute in a vertical direction may be had by adjustment or folding of the pivoted foldable parts 23 and 24. The chute 27 can be supported at any desired horizontal angular position or relation with respect to the supporting mechanism. The bar 18 automatically adjusts itself to same angular relation of the chute when position of the chute 27 is changed.

Attention is called to the fact that the chute supporting mechanism described can be used and operated in close proximity to a vehicle from either side or end and that the coal or the like can be shoveled into the chute and unloaded from the end of the chute at different points or locations. i. e., at any predetermined point or place in the cellar (for storage purposes) by shifting the end of the chute to such predetermined point.

Attention is further called to the fact that the chute supporting mechanism can be placed at any point remote from a wagon or other vehicle and used for the purpose intended without depending on a separate unit for support.

Attention is further called to the fact that different lengths of a chute can be used in combination with the supporting mechanism herein described as the chute supporting mechanism can be placed at any point to accommodate different lengths of chutes thereby permitting the use of long and short chutes as desired.

It will also be observed that in providing a foldable adjustable bracing mechanism that can be adjusted to support the chute supporting mechanism from different size abutments that facilities are provided for supporting the chute supporting mechanism in closer relation to an abutment, an inclined bank or the like as shown by the dotted line A in Fig. 1.

I claim—

1. In a coal chute support, tubular standards connected in spaced and parallel relation to each other, bars telescopically fitted within the tubular standards, a member connected to the telescopic members, a member pivoted to the connecting member to swing in a horizontal plane, cross braces connecting the standards in parallel relation, vertical bearings fitted to said braces, a bar attached to the cross connecting member and slidably fitted in said bearings.

2. In a coal chute support, tubular standards connected in spaced and parallel relation to each other, bars telescopically fitted within the tubular standards, a cross member connecting the telescopic members, a member pivoted to the connecting member to swing in a horizontal plane, vertical bearings fitted to the connecting means of the tubular standards, a bar attached to the member connecting the telescopic bars and adapted to slidably engage the aforesaid bearings, and a foldable supporting means adapted to support the aforesaid mechanism from abutments of irregular or different heights.

In testimony whereof I affix my signature.

GEORGE BUCHAN, Sr.